(12) United States Patent
Shinozawa et al.

(10) Patent No.: US 7,844,383 B2
(45) Date of Patent: Nov. 30, 2010

(54) SIDESLIP ANGLE ESTIMATION APPARATUS AND METHOD AND AUTOMOTIVE VEHICLE INCORPORATING THE SAME

(75) Inventors: Yuuki Shinozawa, Yokosuka (JP); Hiroshi Mouri, Yokohama (JP); Masatsugu Yokote, Yokohama (JP); Masahiro Kubota, Yokohama (JP); Masaaki Nawano, Yokosuka (JP); Tsuyoshi Ohara, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 936 days.

(21) Appl. No.: 11/656,282

(22) Filed: Jan. 22, 2007

(65) Prior Publication Data

US 2007/0173997 A1 Jul. 26, 2007

(30) Foreign Application Priority Data

Jan. 23, 2006 (JP) .............................. 2006-013676
Jul. 21, 2006 (JP) .............................. 2006-199450

(51) Int. Cl.
 *B60T 8/24* (2006.01)
 *B60T 8/32* (2006.01)
 *B60T 8/172* (2006.01)
 *G01P 15/18* (2006.01)

(52) U.S. Cl. .................... 701/72; 701/41; 701/42; 701/70; 701/71; 701/82; 303/177

(58) Field of Classification Search ................ 73/146, 73/170.02, 180, 488, 514.01, 514.06; 303/150; 701/1, 3, 6, 14, 41, 70, 71, 74, 80; 702/141
See application file for complete search history.

(56) References Cited

U.S. PATENT DOCUMENTS

| | | | | |
|---|---|---|---|---|
| 4,840,389 A * | 6/1989 | Kawabe et al. | ............... | 180/415 |
| 5,243,524 A * | 9/1993 | Ishida et al. | ................... | 701/28 |
| 5,297,646 A * | 3/1994 | Yamamura et al. | .......... | 180/415 |
| 5,337,850 A * | 8/1994 | Mouri et al. | ................. | 180/415 |
| 5,645,326 A * | 7/1997 | Sano | ........................... | 303/146 |
| 5,710,705 A * | 1/1998 | Eckert | .......................... | 701/83 |

(Continued)

FOREIGN PATENT DOCUMENTS

DE 40 31 304 A1 4/1992

(Continued)

*Primary Examiner*—Khoi Tran
*Assistant Examiner*—Dale Moyer
(74) *Attorney, Agent, or Firm*—Young Basile

(57) ABSTRACT

In order to enhance the accuracy of estimation of a vehicle's sideslip angle, a sideslip angle estimation apparatus calculates an angle between the direction of centrifugal force acting on the vehicle body during cornering and the lateral direction of the vehicle body based on accelerations exerted on the vehicle body and acting in two different directions. A sideslip angle between the longitudinal direction of the vehicle body and the direction of travel of the vehicle is calculated based on the estimated angle.

20 Claims, 10 Drawing Sheets

U.S. PATENT DOCUMENTS

| | | | |
|---|---|---|---|
| 5,711,023 A * | 1/1998 | Eckert et al. | 701/70 |
| 5,722,743 A * | 3/1998 | Sano | 303/146 |
| 5,732,377 A * | 3/1998 | Eckert | 701/83 |
| 5,842,754 A * | 12/1998 | Sano | 303/147 |
| 6,015,192 A * | 1/2000 | Fukumura | 303/140 |
| 6,526,804 B2 * | 3/2003 | Takahashi | 73/9 |
| 6,618,661 B2 * | 9/2003 | Kogure | 701/80 |
| 6,650,987 B2 * | 11/2003 | Kogure et al. | 701/80 |
| 6,662,898 B1 * | 12/2003 | Mattson et al. | 180/446 |
| 6,931,313 B2 * | 8/2005 | Kato et al. | 701/41 |
| 7,302,328 B2 * | 11/2007 | Kato et al. | 701/41 |
| 7,739,014 B2 * | 6/2010 | Lu et al. | 701/48 |
| 2001/0027893 A1 | 10/2001 | Katsutoshi et al. | |
| 2002/0007661 A1 * | 1/2002 | Takahashi | 73/9 |
| 2002/0072842 A1 * | 6/2002 | Kogure | 701/80 |
| 2002/0087251 A1 * | 7/2002 | Kogure et al. | 701/80 |
| 2003/0089542 A1 | 5/2003 | Mori | |
| 2003/0130775 A1 * | 7/2003 | Lu et al. | 701/36 |
| 2003/0191572 A1 * | 10/2003 | Roll et al. | 701/70 |
| 2003/0195689 A1 * | 10/2003 | Mori | 701/70 |
| 2004/0015284 A1 * | 1/2004 | Suissa | 701/71 |
| 2004/0046447 A1 * | 3/2004 | Wanke et al. | 303/140 |
| 2004/0074693 A1 * | 4/2004 | Mattson et al. | 180/446 |
| 2005/0071061 A1 * | 3/2005 | Kato et al. | 701/41 |
| 2005/0080532 A1 * | 4/2005 | Kato et al. | 701/41 |
| 2005/0125131 A1 | 6/2005 | Kato et al. | |
| 2006/0069481 A1 * | 3/2006 | Kubota et al. | 701/41 |
| 2007/0067085 A1 * | 3/2007 | Lu et al. | 701/70 |
| 2008/0059021 A1 * | 3/2008 | Lu et al. | 701/36 |
| 2008/0059034 A1 * | 3/2008 | Lu | 701/71 |
| 2008/0082246 A1 * | 4/2008 | Brown et al. | 701/91 |
| 2008/0086248 A1 * | 4/2008 | Lu et al. | 701/41 |
| 2008/0086251 A1 * | 4/2008 | Lu et al. | 701/70 |

FOREIGN PATENT DOCUMENTS

| | | |
|---|---|---|
| DE | 42 17 710 A1 | 12/1993 |
| DE | 42 18 034 A1 | 12/1993 |
| DE | 103 25 485 A1 | 1/2004 |
| EP | 1 386 805 A2 | 2/2004 |
| EP | 1 520 761 A2 | 4/2005 |
| FR | 2 804 648 A | 8/2001 |
| JP | 08-332934 | 12/1996 |

* cited by examiner

Gx : LONGITUDINAL G SENSOR VALUE
Gy : LATERAL G SENSOR VALUE
Ay : G IN DIRECTION OF TURNING RADIUS

Gx : LONGITUDINAL G SENSOR VALUE
Gy : LATERAL G SENSOR VALUE
Ay : G IN DIRECTION OF TURNING RADIUS
$\dot{V}x$ : VARIATION IN LONGITUDINAL VELOCITY
$\dot{V}y$ : VARIATION IN LATERAL VELOCITY

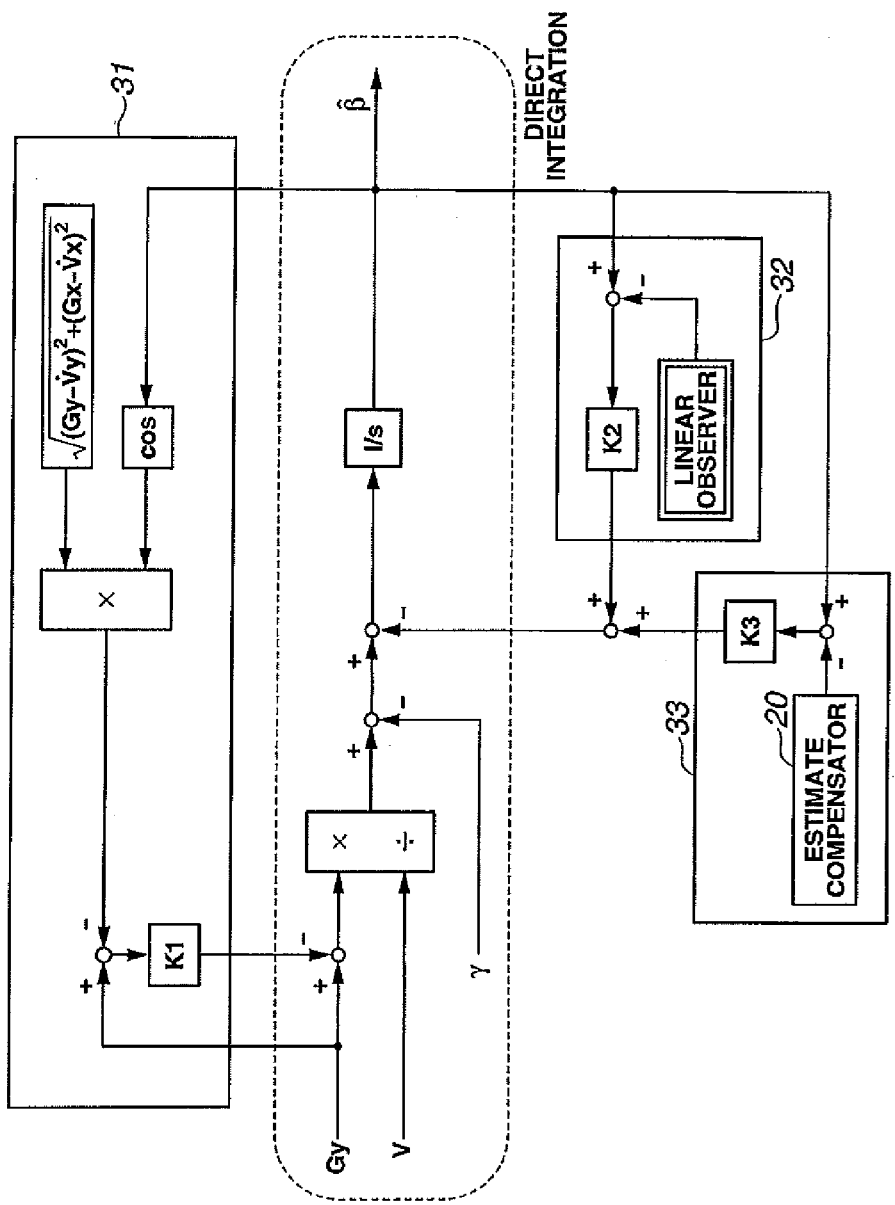

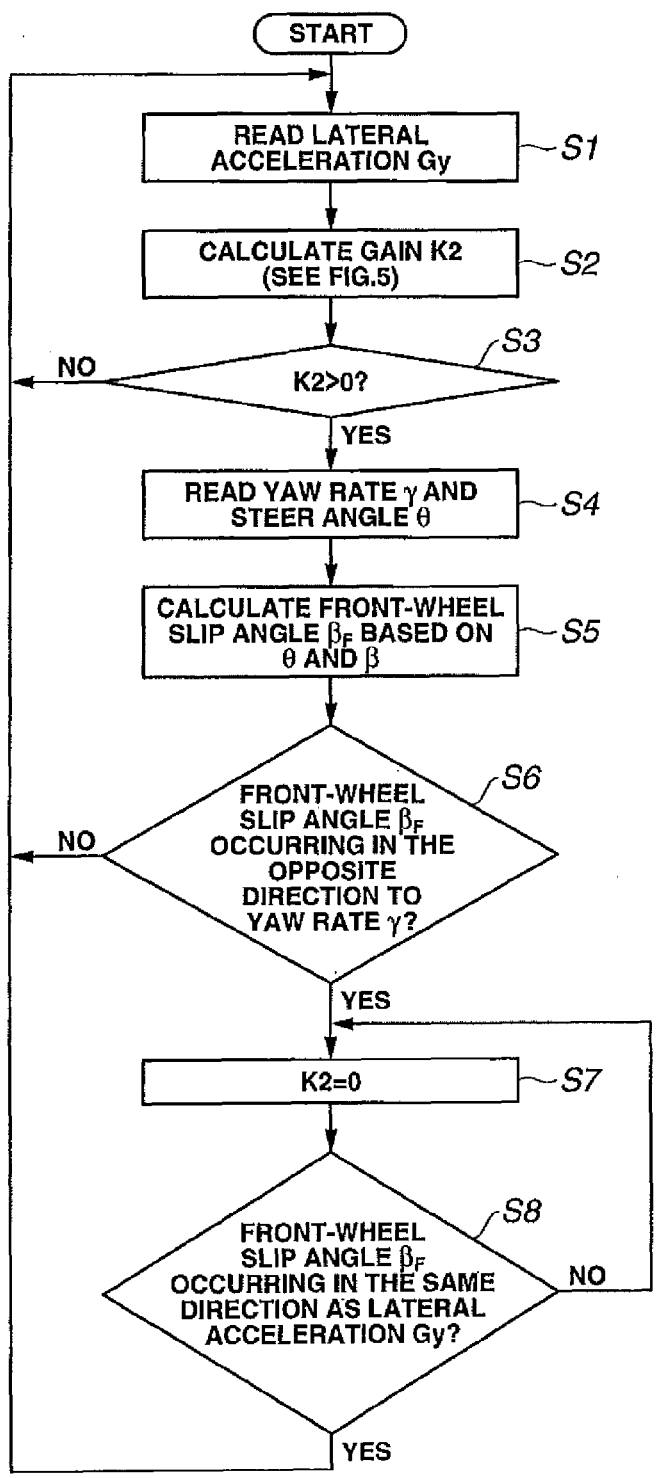

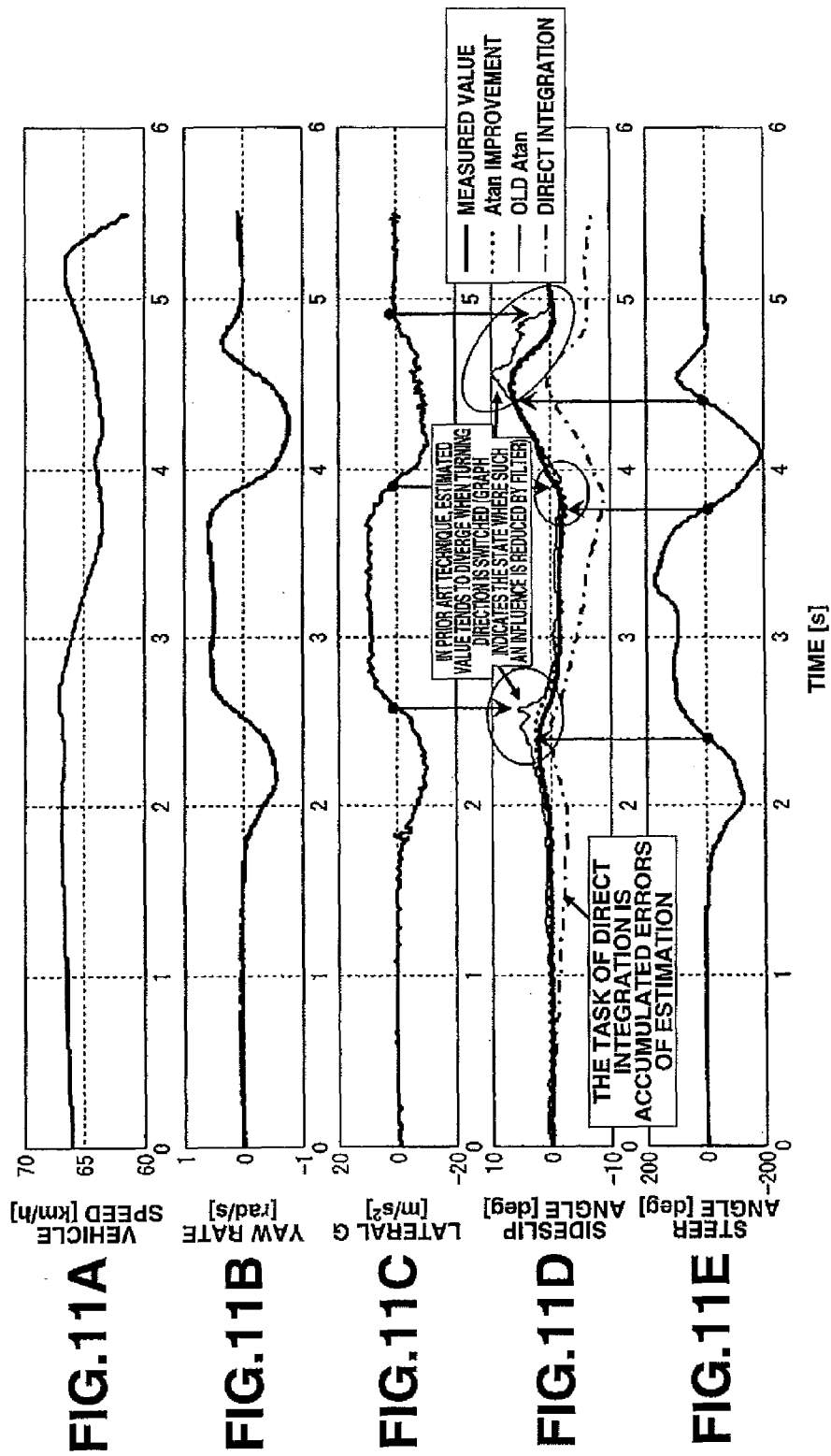

SIDESLIP ANGLE ESTIMATION APPARATUS AND METHOD AND AUTOMOTIVE VEHICLE INCORPORATING THE SAME

CROSS-REFERENCE TO RELATED APPLICATION

This application claims priority from Japanese Patent Application Serial No. 2006-013676, filed Jan. 23, 2006, and No. 2006-199450, filed Jul. 21, 2006, which are each incorporated herein in their entirety by reference.

TECHNICAL FIELD

The present invention relates to a sideslip angle estimation apparatus, an automotive vehicle employing the same, and a sideslip angle estimation method.

BACKGROUND

Conventionally, there have been proposed various sideslip angle estimation devices in which a sideslip angle is estimated by an integral calculus operation utilizing vehicle speed, yaw rate, and lateral acceleration as parameters. A sideslip angle is also estimated or derived from a vehicle model whose input variable is a quantity of state of a vehicle. A final sideslip angle is estimated based on both of the sideslip angle estimated by the integral calculus operation and the sideslip angle estimated by the vehicle model. A time constant of the integral calculus operation is adjusted depending on the sideslip angle estimated by the vehicle model.

One such sideslip angle estimation device has been disclosed in Japanese Patent Provisional Publication No. 8-332934.

BRIEF SUMMARY OF THE INVENTION

Embodiments of a sideslip angle estimation apparatus for estimating a sideslip angle of a vehicle are taught herein. According to one exemplary embodiment, the apparatus comprises an acceleration detection section operable to detect acceleration values in two different directions with respect to a vehicle body, a first sideslip angle estimation section operable to estimate a first sideslip angle between a direction of centrifugal force acting on the vehicle body and a lateral direction of the vehicle body based on the acceleration values detected by the acceleration detection section and a sideslip angle calculation section operable to calculate the sideslip angle of the vehicle based on the first sideslip angle.

Another embodiment comprises first means for detecting a first acceleration in a first direction with respect to a vehicle body, second means for detecting a second acceleration in a second direction with respect to the vehicle body, means for estimating a first sideslip angle between a direction of centrifugal force acting on the vehicle body and a lateral direction of the vehicle body based on the first acceleration and the second acceleration and means for calculating the sideslip angle based on the first sideslip angle.

Methods of estimating the sideslip angle of a vehicle are also taught herein. One exemplary method includes detecting a first acceleration in a first direction with respect to a vehicle body, detecting a second acceleration in a second direction with respect to the vehicle body, estimating a first sideslip angle between a direction of centrifugal force acting on the vehicle body and a lateral direction of the vehicle body based on the first acceleration and the second acceleration and calculating the sideslip angle based on the first sideslip angle.

BRIEF DESCRIPTION OF THE DRAWINGS

The description herein makes reference to the accompanying drawings wherein like reference numerals refer to like parts throughout the several views, and wherein:

FIG. 7 is a block diagram showing a sideslip angle estimation apparatus of a second embodiment;

FIG. 10 is a flow chart showing a gain setting process executed within an apparatus of a fourth embodiment; and FIGS. 11A-11E are time charts showing the effects obtained by the apparatus of the fourth embodiment.

DETAILED DESCRIPTION OF EMBODIMENTS OF THE INVENTION

In the device as disclosed in the above-mentioned publication, a check is made to determine, based on the sideslip angle estimated by the vehicle model, whether the dynamic behavior of the vehicle is conditioned in a non-linear area. However, the relationship between the non-linear area of the vehicle behavior and the sideslip angle varies depending on a given environment and operating condition (or running condition) of the vehicle. There is a possibility that the accuracy of estimation of the final sideslip angle is lowered owing to a modeling error of the vehicle model and a cumulative error of the integral calculus operation. In particular, in the case of a critical behavior, it is difficult to accurately estimate a sideslip angle.

Embodiments of the invention are provided to enhance the estimation accuracy of the estimated sideslip angle. A sideslip angle estimation apparatus according to embodiments of the invention comprises an acceleration detection section that detects accelerations exerted on a vehicle body and acting in two different directions and a first sideslip angle estimation section that estimates, based on the vehicle-body accelerations detected by the acceleration detection section, a first sideslip angle defined as an angle between a direction of a centrifugal force acting on the vehicle body and a lateral direction of the vehicle body. A sideslip angle calculation section arithmetically calculates, based on the first sideslip angle estimated by the first sideslip angle estimation section, a sideslip angle of a vehicle.

Geometrically, the angle between the direction of centrifugal force acting on the vehicle body during cornering and the lateral direction of the vehicle is identical to the sideslip angle between the longitudinal direction of the vehicle body and the direction of travel of the vehicle.

According to embodiments described herein, the first sideslip angle between the direction of centrifugal force acting on the vehicle body and the lateral direction of the vehicle body is estimated based on the accelerations detected by the acceleration detection section, and then the sideslip angle of the vehicle is calculated based on the estimated first sideslip angle. Thus, there is no risk of causing an error of sideslip-angle estimation owing to a cumulative error of an integral calculus operation. Therefore, it is possible to enhance the accuracy of estimation of the estimated sideslip angle.

Hereinafter, certain embodiments of the invention are explained with reference to the drawings.

Figure 1A:
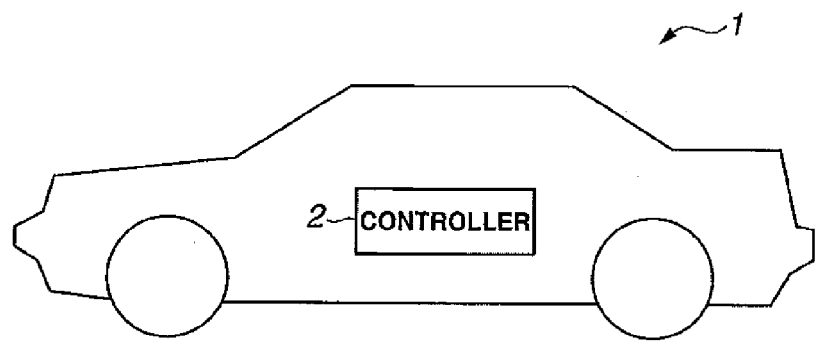
FIG. 1A is a side view of a vehicle employing a controller capable of executing a sideslip-angle estimation according to embodiments of the invention.
Figure 1B:
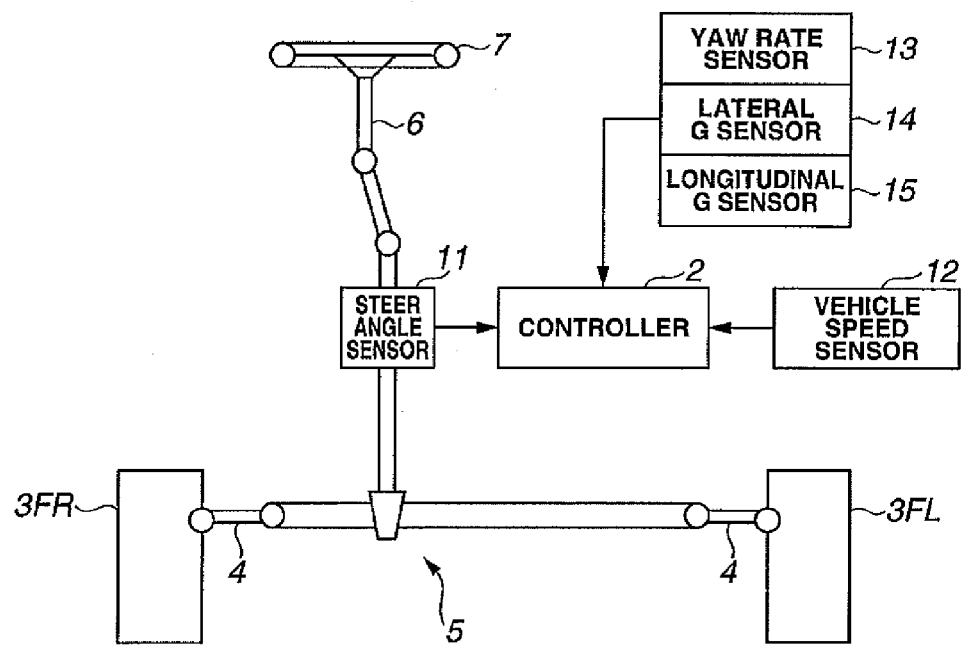
FIG. 1B is a schematic system block diagram of the vehicle.

FIGS. 1A-1B are block diagrams showing a schematic vehicle system configuration. As shown in FIG. 1A, a controller 2 is installed on an automotive vehicle 1. The controller 2 is used for estimating a sideslip angle β between the longitudinal direction of the vehicle body and the direction of travel of the vehicle. The controller 2 generally comprises a microcomputer including a central processing unit (CPU), input and output ports (I/O), random access memory (RAM), keep alive memory (KAM), a common data bus and read-only memory (ROM) as an electronic storage medium for executable programs and certain stored values as discussed hereinafter.

As can be seen from the system block diagram of FIG. 1B, front road wheels 3FL and 3FR of vehicle 1 are connected to a steering wheel 7 through tie rods 4, a rack-and-pinion mechanism 5, and a steering shaft 6, in that order. Rotary motion of steering wheel 7 is converted into rectilinear motion of tie rods 4 in the left-and-right direction through rack-and-pinion mechanism 5 so as to steer front road wheels 3FL and 3FR about their kingpins.

Vehicle sensor signals, namely, a steer angle detected by a steer angle sensor 11, a vehicle speed (or vehicle velocity) detected by a vehicle speed sensor 12, a yaw rate detected by a yaw rate sensor 13, a lateral acceleration detected by a lateral acceleration sensor 14, and a longitudinal acceleration detected by a longitudinal acceleration sensor 15, are input into controller 2.

Figure 2:
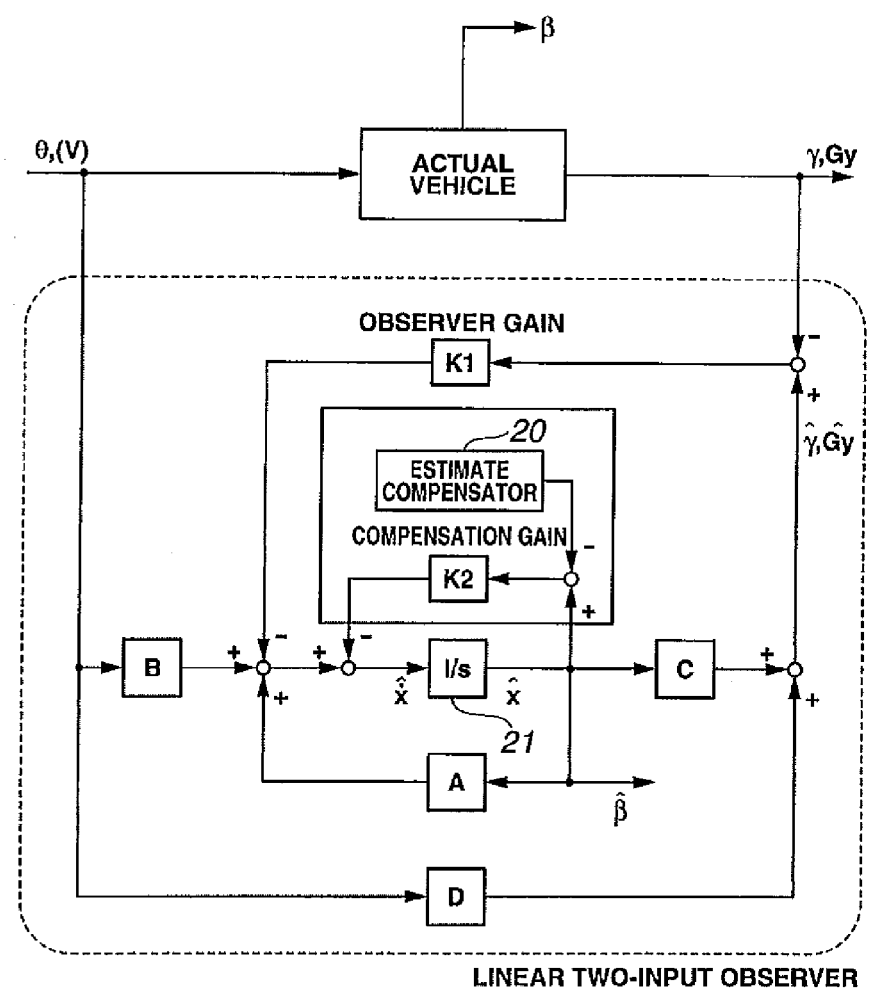
FIG. 2 is a block diagram showing a sideslip angle estimation apparatus of a first embodiment.

FIG. 2 is a block diagram showing the linear two-input observer used to estimate sideslip angle β within controller 2. Symbols A to D correspond to matrixes, which are determined based on a linearized two-wheel model of the vehicle 1. Symbol K1 denotes an observer gain of an observer employing an estimate compensator 20. Symbol K2 denotes a compensation gain (a feedback gain) of the estimate compensator 20.

The observer is first explained in detail. The two-wheel model of the vehicle 1, that is, the basis of the observer, is represented by the following mathematical expression by balance of the force acting in the lateral direction and the moment.

$$mV(\dot{\beta}+\gamma)=-Cp_f(\beta+L_f\gamma/V-\delta)-Cp_r(\beta-L_r\gamma/V)$$

$$I\dot{\gamma}=-Cp_f(\beta+L_f\gamma/V-\delta)L_f+Cp_r(\beta-L_r\gamma/V)L_r \qquad (1)$$

The above mathematical expression is rewritten in the form of a state equation. Assuming that an input u is a steer angle of a tire, and outputs of an equation are a yaw rate and a lateral acceleration, the state equation is represented as follows.

$$\begin{cases} \dot{x} = Ax + Bu, & x = \begin{bmatrix} \beta \\ \gamma \end{bmatrix}, \quad u = \delta \\ y = Cx + Du, & y = \begin{bmatrix} \gamma \\ Gy \end{bmatrix} \end{cases} ; \text{wherein} \qquad (2)$$

$$A = \begin{bmatrix} -\dfrac{Cp_f + Cp_r}{mV} & -\dfrac{Cp_fL_f - Cp_rL_r}{mV^2} - 1 \\ -\dfrac{Cp_fL_f - C_rL_r}{I} & -\dfrac{Cp_fL_f^2 + Cp_rL_r^2}{IV} \end{bmatrix};$$

$$B = \begin{bmatrix} \dfrac{Cp_f}{mV} \\ \dfrac{Cp_fL_f}{I} \end{bmatrix}; C = \begin{bmatrix} 0 & 1 \\ Va_{11} & V(a_{12}+1) \end{bmatrix}; \text{and } D = \begin{bmatrix} 0 \\ Vb_1 \end{bmatrix}$$

The meanings of respective symbols are as follows:

m is a mass of the vehicle;

I is a yaw moment of inertia;

$L_f$ is a distance between the center of gravity of the vehicle and the front axle;

$L_r$ is a distance between the center of gravity of the vehicle and the rear axle;

$Cp_f$ is a front-wheel cornering power (a total cornering power of front-left and front-right road wheels);

$Cp_r$ is a rear-wheel cornering power (a total cornering power of rear-left and rear-right road wheels);

V is a vehicle speed;

β is a sideslip angle;

γ is a yaw rate;

Gy is a lateral acceleration;

$a_{11}, a_{12}, b_1$ are each elements of matrixes A and B as indicated by the subscripts;

δ is a steer angle;

$\dot{\beta}$ is a variation in the sideslip angle; and $\dot{\gamma}$ is a variation in the yaw rate.

The linear two-input observer, which is provided to estimate sideslip angle β of the vehicle, is designed based on the previously-noted state equation. The inputs of the observer are the lateral acceleration and the yaw rate. Observer gain K1 is set in a manner so as to be hard to be influenced by a modeling error and additionally to stably estimate a state variable, that is, sideslip angle β. It will be understood that the technique to design the observer is not limited to the particular embodiment as discussed above, but that the exemplified estimating technique may be replaced by a different technique of estimation or observation.

Figure 3:
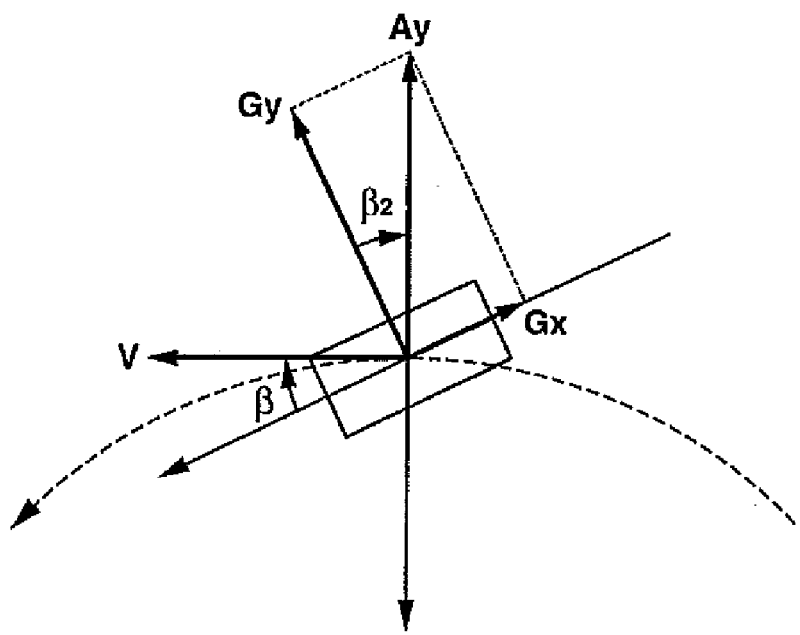
FIG. 3 is an explanatory view showing the principle of action of centrifugal force acting on the vehicle during cornering.

Estimate compensator 20 is next described in detail. A centrifugal force (hereinafter is referred to as "field force") exerted on the vehicle body during cornering acts toward the outside from the turning center. Therefore, as shown in FIG. 3, assuming that a traveling vehicle is shifting to a cornering state (or a turning state) with a sideslip angle β, as a matter of course the "field force" acting on the vehicle body takes place in the direction offset from the lateral direction (the y-direction of a vehicle axis system (x, y, z)) of the vehicle body by sideslip angle β. Geometrically, sideslip angle β becomes equal to the offset angle $β_2$ of the direction of action of the "field force" (β=β₂). Therefore, a first sideslip angle β₂, which is used to compensate for estimation of the observer, can be derived or computed as the offset angle itself by arithmetically calculating the offset angle β₂ of "field force" by using Atan (Gy/Gx), where Gy denotes the lateral acceleration and Gx denotes a longitudinal acceleration. The concrete calculation is as follows:

$$\beta_2 = \frac{1}{2}\pi - A\tan\left(\frac{Gy}{Gx}\right). \quad (3)$$

Figure 4:
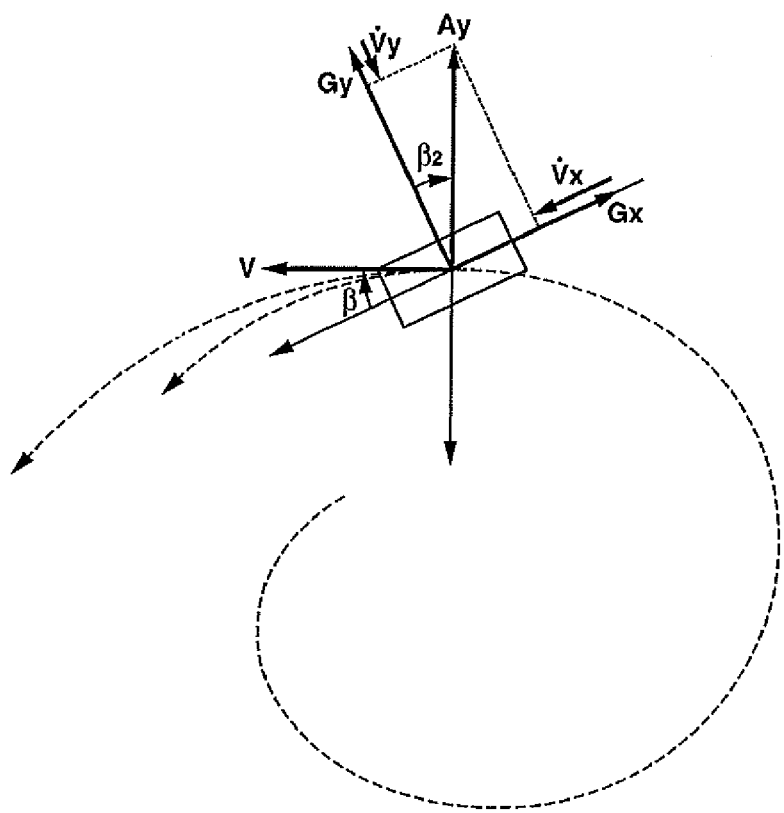
FIG. 4 is an explanatory view showing the principle of action of centrifugal force acting on the vehicle during cornering with a change in vehicle speed.

FIG. 4 shows the equilibrium of forces, further taking into account a change in vehicle speed (vehicle velocity) V. Regarding the "field force" created in the cornering state and the "field force" created in the accelerating/decelerating state of the vehicle, it is possible to extract only the "field force" created in the cornering state by subtracting the external force acting on the vehicle body and directly proportional to a time rate of change in the vector velocity of the vehicle in the direction of action of each of these "field forces" from the detected value of each "field force". The equilibrium of forces shown in FIG. 4 can be taken into account in a similar manner to the analysis of FIG. 3. Thus, the following arithmetic processing is made within the estimate compensator. Hereupon, a lateral velocity Vy is calculated from both of the vehicle speed and the estimated sideslip angle β geometrically (concretely, using tan β):

$$\beta_2 = \frac{1}{2}\pi - A\tan\left(\frac{Gy - \dot{V}y}{Gx - \dot{V}x}\right); \text{ wherein} \quad (4)$$

$\hat{V}x$ is the variation in the longitudinal velocity; and $\hat{V}y$ is the variation in the lateral velocity.

Figure 5:
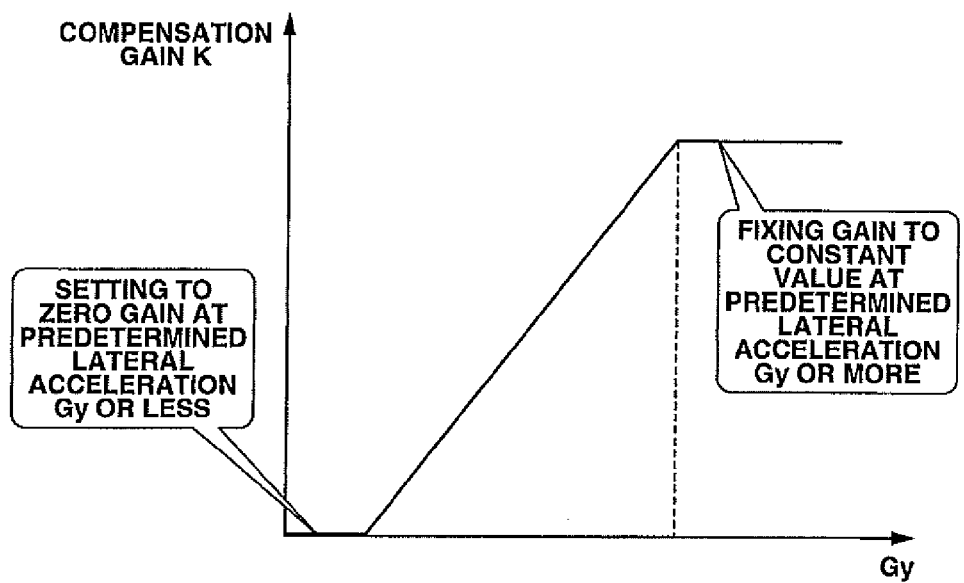
FIG. 5 is a control map used to calculate a compensation gain.
Figure 6A:
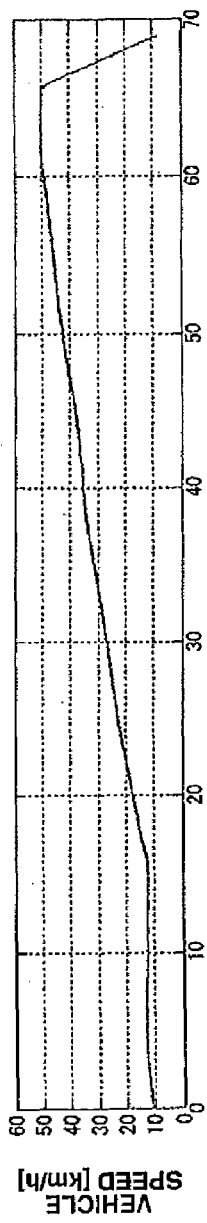
FIGS. 6A-6D are time charts showing the effects obtained by the apparatus of the first embodiment.
Figure 6B:
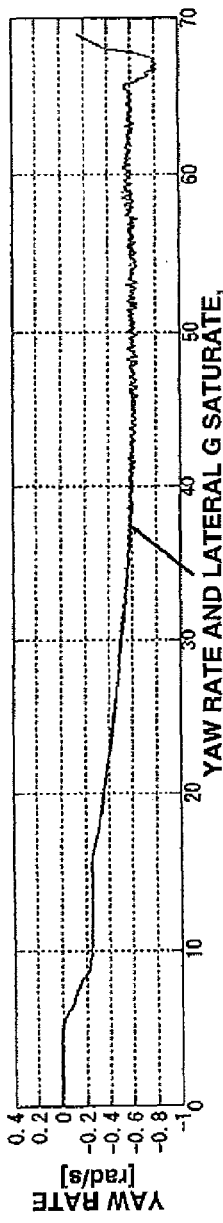
Figure 6C:
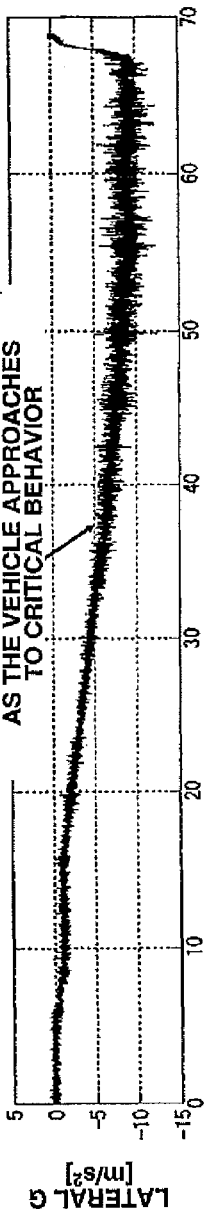
Figure 6D:
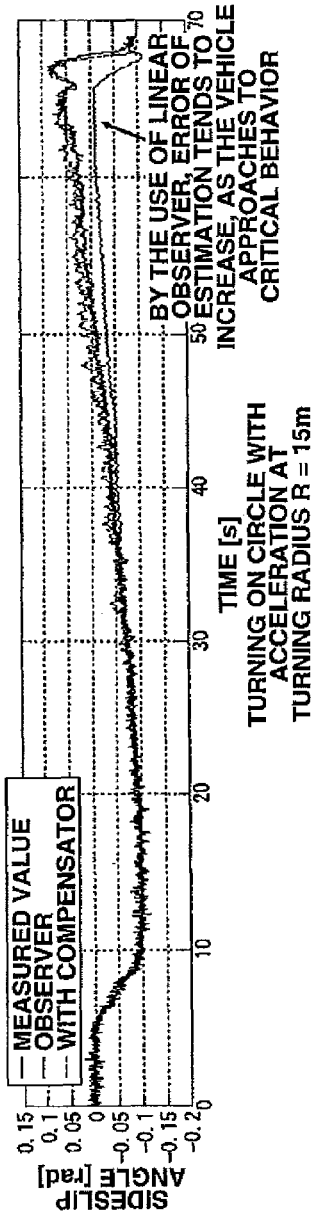

The deviation between first sideslip angle β₂ calculated by expression (4) and the sideslip angle β (the second sideslip angle) estimated by the observer is fed back to an integrator 21 included in the observer (shown in FIG. 2). Feedback gain K2 for feedback correction is calculated or retrieved from the control map of FIG. 5. In the control map, the x-axis or abscissa indicates lateral acceleration Gy, whereas the y-axis or ordinate indicates feedback gain K2. As can be seen from the control map of FIG. 5, when lateral acceleration Gy is less than or equal to a predetermined acceleration value near "0", gain K2 is set to "0". From a point where lateral acceleration Gy having a certain magnitude, such as 0.1 G (gravitational acceleration), begins to develop, feedback gain K2 tends to gradually increase in direct proportion to the magnitude of lateral acceleration Gy. When lateral acceleration Gy having an acceleration value greater than or equal to a predetermined acceleration value such as 0.5 G is generated, feedback gain K2 is fixed to a predetermined gain (an upper limit) at which the stability of the control system is maintained at a high level.

Next, the operation of the apparatus of the first embodiment is described in detail.

A typical linear observer is able to accurately estimate a sideslip angle β in a linear area in which the sideslip angle of a tire does not have a non-linear characteristic under a particular road surface condition already assumed when designing a vehicle model. However, when a friction factor of a road surface on which the vehicle is traveling varies or when approaching a cornering performance limit (or a turning performance limit), the estimated value produced by the observer tends to gradually deviate from the measured value, thereby resulting in a deterioration in the accuracy of estimation. This effect can be seen from the time charts of FIGS. 6A-6D.

On the other hand, the angle β₂ between the direction of the "field force" acting on the vehicle body during cornering and the lateral direction of the vehicle body becomes geometrically identical to sideslip angle β between the longitudinal direction of the vehicle body and the direction of travel of the vehicle regardless of operating conditions (running conditions) of the vehicle, even when approaching a cornering performance limit.

Therefore, as shown in FIG. 2, feedback compensation for the integral calculus operation executed within integrator 21 is made depending on the difference between sideslip angle (second sideslip angle) β and first sideslip angle β₂. Thus, the error of sideslip-angle estimation, which may occur owing to a cumulative error of the integral calculus operation, can be corrected or compensated for in real time. And thus, as can be seen from the time charts of FIGS. 6A-6D, the estimated value of sideslip angle β₃ approximates closer to the measured value.

Assuming that the vehicle is traveling at a constant speed, the direction of the "field force" can be calculated only based on longitudinal acceleration Gx and longitudinal acceleration Gy from mathematical expression (3). Usually, a vehicle speed change occurs, and thus the direction of the "field force" is determined or calculated from mathematical expression (4) while fully taking into account a variation in vehicle velocity in order to enhance the accuracy of sideslip-angle estimation.

From the point aimed at the "field force", as a matter of course, the accuracy of calculation of first sideslip angle β₂ is dependent on the frequency of "field forces". In a moderate cornering region in which the vehicle is traveling almost straight, and thus the magnitude of lateral acceleration Gy and the yaw rate are both low, the accuracy of calculation of first sideslip angle β₂ tends to lower. At this time, the accuracy of estimation of sideslip angle (second sideslip angle) β estimated by the observer tends to increase due to the reduced modeling error. For the reasons discussed above, it is possible to coordinate the state observer (state estimator) and feedback compensation with each other while making use of the advantage of sideslip-angle estimation achieved by the observer and the advantage of feedback compensation performed by estimate compensator 20 by changing a weight for feedback compensation depending on the vehicle turning-run state (or the vehicle cornering-run state, simply, the cornering state). Concretely, the weight for feedback compensation can be increased by increasing feedback gain K2 as the cornering state of the vehicle approaches to its cornering performance limit, that is, as lateral acceleration Gy increases.

Suppose that a so-called division-by-zero (/zero) error occurs in the Atan-calculation of mathematical expressions (3) and (4). In such a case, the calculated value tends to diverge, and therefore it is impossible to perform appropriate feedback compensation. Thus, in the non-cornering region in which the "field force" is weak so that the so-called division-by-zero (/zero) error often occurs, feedback compensation executed within estimate compensator 20 is halted. Concretely, feedback gain K2 is adjusted to "0" when lateral acceleration Gy is less than or equal to the predetermined acceleration value near "0" (e.g., 0.1 G).

For the same reason, in the non-cornering region in which the "field force" is weak and thus the so-called division-by-zero (/zero) error tends to occur, the value of first sideslip angle β₂ may be set to "0".

In the first embodiment, the sideslip angle estimation apparatus is configured to vary feedback gain K2 depending on the magnitude of lateral acceleration Gy. It will be understood that the adjustment of feedback gain K2 is not limited to the particular embodiment as discussed above, but that the feedback gain may be varied depending on another parameter indicative of the cornering state of the vehicle. For instance, the feedback gain may be varied depending on the yaw rate.

In the first embodiment, sideslip angle $\beta$ (second sideslip angle) is estimated by the observer, first sideslip angle $\beta_2$ is calculated by means of estimate compensator 20, and the difference between the estimated sideslip angle $\beta$ and the calculated first sideslip angle $\beta_2$ is calculated. And then, feedback compensation for the integral calculus operation is executed within integrator 21 included in the observer, responsive to the calculated difference. It will be appreciated that the feedback compensation is not limited to the particular embodiment as discussed above, but that first sideslip angle $\beta_2$ itself may be estimated as sideslip angle $\beta$, since first sideslip angle $\beta_2$ is calculated by only the estimate compensator 20. However, suppose that such a technique is applied to the actual vehicle. Note that first sideslip angle $\beta_2$, calculated by estimate compensator 20, is sensitive to a noise signal generated by the measurement sensor. Thus, in such a case, it is desirable to eliminate or reduce the noise signal by filtering the detected signal value.

As will be appreciated from the above description, the observer shown in FIG. 2 is the section that performs the function of second sideslip angle estimation. Lateral acceleration sensor 14 and longitudinal acceleration sensor 15 perform acceleration detection. Arithmetic calculations of the mathematical expressions (3) and (4), executed within estimate compensator 20, perform the function of first sideslip angle estimation. Estimate compensator 20 is the section of the apparatus that performs compensation.

In summary, first sideslip angle $\beta_2$ between the direction of centrifugal force acting on the vehicle body during cornering and the lateral direction of the vehicle body is estimated based on the detected values of two accelerations detected by lateral acceleration sensor 14 and longitudinal acceleration sensor 15 and exerted on the vehicle body and acting in two different directions. Second sideslip angle $\beta$ between the longitudinal direction of the vehicle body and the direction of travel of the vehicle is estimated via an integral calculus operation that utilizes vehicle operating conditions (or vehicle running conditions) as parameters. Feedback compensation for the integral calculus operation is made based on the deviation between second sideslip angle $\beta$ and first sideslip angle $\beta_2$. Therefore, it is possible to make up for or alter an error of sideslip-angle estimation occurring owing to a cumulative error of the integral calculus operation. Thus, in spite of the very simple system configuration, it is possible to easily and accurately estimate sideslip angle $\beta$.

Second, first sideslip angle $\beta_2$ between the direction of centrifugal force acting on the vehicle body during cornering and the lateral direction of the vehicle body is estimated based on a variation of vehicle speed (exactly, a time rate of change in the vector velocity of the vehicle) and a vehicle-body acceleration detected by the acceleration detection section. Therefore, even under the vehicle operating condition where a vehicle speed change occurs, it is possible to accurately calculate first sideslip angle $\beta_2$ between the direction of centrifugal force acting on the vehicle body during cornering and the lateral direction of the vehicle body.

Third, a weight for feedback compensation is changed depending on the cornering state of the vehicle. Therefore, it is possible to coordinate the state observer (state estimator) and feedback compensation with each other while making use of the advantage of estimation of sideslip angle $\beta$ and feedback compensation. As a whole system, it is possible to ensure high-precision estimation of sideslip angle $\beta$.

Fourth, the weight for feedback compensation increases as the cornering state of the vehicle approaches to a cornering performance limit. Therefore, it is possible to more certainly cooperate the state observer (state estimator) and feedback compensation with each other, while making use of the advantage of estimation of sideslip angle $\beta$ and feedback compensation. As a whole system, it is possible to ensure high-precision estimation of sideslip angle $\beta$.

Fifth, when the cornering state of the vehicle is within the non-cornering region, the feedback compensation is halted. Therefore, it is possible to avoid a situation where the appropriate feedback compensation cannot be performed due to a so-called division-by-zero (/zero) error, which may occur in the Atan-calculation of mathematical expressions (3) and (4), thus preventing the accuracy of sideslip-angle estimation from being deteriorated.

Sixth, when the cornering state of the vehicle is within the non-cornering region, first sideslip angle $\beta_2$ is set to "0". Therefore, it is possible to avoid a situation where the appropriate feedback compensation cannot be performed due to a so-called division-by-zero (/zero) error, which may occur in the Atan-calculation of mathematical expressions (3) and (4), thus preventing the accuracy of sideslip-angle estimation from being deteriorated. That is, it is possible to suppress a drift or vibration in the estimated sideslip angle $\beta$. Additionally, when the cornering state of the vehicle is within the non-cornering region, it is possible to provide the same effect by calculating the sideslip angle of the vehicle using second sideslip angle $\beta$ instead of using first sideslip angle $\beta_2$. On the other hand, under a vehicle's cornering state, the sideslip angle of the vehicle may be calculated by using first sideslip angle $\beta_2$ instead of using second sideslip angle $\beta$.

Furthermore, the sideslip angle of the vehicle is calculated by using second sideslip angle $\beta$ in the vehicle non-cornering state, whereas the sideslip angle of the vehicle is calculated by using first sideslip angle $\beta_2$ in the vehicle cornering state, so as to switch between first and second sideslip angles $\beta_2$ and $\beta$, respectively, depending on whether the vehicle is conditioned in the cornering state or in non-cornering state. Thereafter the switched one may be used as the final sideslip angle of the vehicle.

Seventh, first sideslip angle $\beta_2$ between the direction of centrifugal force acting on the vehicle body during cornering and the lateral direction of the vehicle body is estimated based on the detected values of two accelerations detected by lateral acceleration sensor 14 and longitudinal acceleration sensor 15 and exerted on the vehicle body and acting in two different directions. Estimated first sideslip angle $\beta_2$ is calculated as the sideslip angle $\beta$ between the longitudinal direction of the vehicle body and the direction of travel of the vehicle.

In general techniques that have paid attention to how to derive a sideslip velocity (lateral velocity of the vehicle body) for estimation of sideslip angle $\beta$, it is impossible to eliminate an integral calculus operation for the detected value of the acceleration sensor. Here, however, first sideslip angle $\beta_2$ is estimated on the basis of the principle of action of centrifugal force acting on the vehicle during cornering, and then estimated first sideslip angle $\beta_2$ itself is calculated as sideslip angle $\beta$ of the vehicle. Thus, in spite of the simpler system configuration, it is possible to easily estimate sideslip angle $\beta$. Additionally, there is no risk of causing an error of sideslip-angle estimation owing to a cumulative error of an integral calculus operation and causing a modeling error of the vehicle model. Thus, it is possible to ensure high-precision sideslip angle β estimation.

Additionally, first sideslip angle $β_2$ between the direction of centrifugal force acting on the vehicle body during cornering and the lateral direction of the vehicle body is estimated based on the detected values of two accelerations detected by lateral acceleration sensor 14 and longitudinal acceleration sensor 15 and exerted on the vehicle body and acting in two different directions. Second sideslip angle β between the longitudinal direction of the vehicle body and the direction of travel of the vehicle is estimated via an integral calculus operation that utilizes the vehicle operating conditions as parameters. And then, feedback compensation for the integral calculus operation is made based on the deviation between second sideslip angle β and first sideslip angle $β_2$. Therefore, it is possible to make up for or alter an error of sideslip-angle estimation occurring owing to a cumulative error of the integral calculus operation. In spite of the simple system configuration, it is possible to easily and accurately estimate sideslip angle β.

A second embodiment of the invention is now explained. As shown in FIG. 7, the apparatus of the second embodiment refers mainly to direct integration (a third sideslip angle estimation section) by which sideslip angle β is estimated. Direct integration means a technique of calculating sideslip angle β by integrating the following expression, which can be derived by balance of motion in the lateral direction of the vehicle:

$$A_y = V(γ+\dot{β}); \text{ wherein} \quad (5)$$

$A_y$ is the acceleration in the direction of the turning radius.

Also provided are a first correction section 31, a second correction section 32 and a compensation section 33. First correction section 31 performs feedback correction for lateral acceleration Gy on the basis of the principle of action of centrifugal force acting on the vehicle during cornering, while estimating sideslip angle β mainly by use of direct integration. The second correction section 32 performs feedback correction for an integral calculus operation on the basis of the linear observer (the second sideslip angle estimation section). The compensation section 33 performs feedback compensation for the integral calculus operation on the basis of the previously-noted estimate compensator 20 (the first sideslip angle estimation section).

First, as the principle of feedback correction, first correction section 31 utilizes the fact that the relationship among the "field force" caused by cornering operation of the vehicle, lateral acceleration Gy and sideslip angle β is represented by the following expression:

$$\hat{G}y = \cos β × \sqrt{(Gy-\dot{V}y)^2 + (Gx-\dot{V}x)^2} \quad (6)$$

wherein $\hat{G}y$ is the estimated lateral acceleration Gy.

Lateral acceleration $\hat{G}y$, arithmetically calculated by substituting vehicle speed V, the actual lateral acceleration Gy, the actual longitudinal acceleration Gx and the estimated sideslip angle β into the respective symbols of the above expression, is compared to lateral acceleration Gy sensed or detected by the lateral acceleration sensor 14. Feedback compensation is performed based on the deviation between the calculated lateral acceleration and the sensed lateral acceleration.

Figure 8:
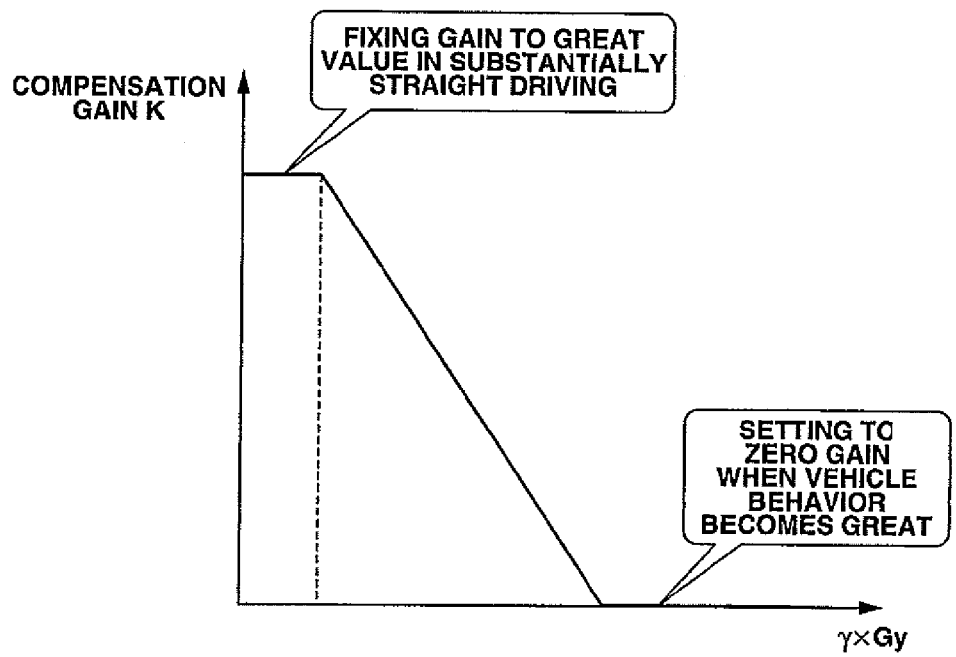
FIG. 8 is a control map used to calculate a compensation gain.

Second, within second correction section 32 sideslip angle β is estimated by means of the linear observer except estimate compensator 20 shown in FIG. 2, separately from the direct integration. Feedback compensation is performed based on the deviation between the estimated value calculated by the direct integration and the estimated value estimated by the linear observer. In a straight driving state or in a vehicle traveling pattern in which the vehicle is traveling almost straight, there is a reduced tendency for an error of sideslip-angle estimation to be affected by a modeling error. Thus, it is possible to estimate sideslip angle β with adequate accuracy by means of the linear observer. For the reasons discussed above, as can be seen from the control map of FIG. 8, in the non-cornering region in which lateral acceleration Gy and yaw rate γ are both low, feedback gain K2 is designed to be fixed to a predetermined gain (an upper limit). Gain K2 decreases as the cornering state of the vehicle approaches to a critical vehicle behavior (or a cornering performance limit).

Third, within compensation section 33, in the same manner as the first embodiment, first sideslip angle $β_2$ is calculated by way of the Atan(Gy/Gx)-calculation executed within estimate compensator 20. And then the deviation between the calculated first sideslip angle $β_2$ and sideslip angle β estimated by way of direct integration is calculated. Thereafter, a feedback gain K3 is set or retrieved based on lateral acceleration Gy from the control map of FIG. 5. Compensation section 33 performs the feedback compensation based on the deviation and the feedback gain K3. Previously-discussed gains K1, K2 and K3 are collectively referred to as "gain K".

A specific gravity (or a relative density) of each of gains K1 to K3, that is, a relative weight of each gain, is changed depending on the cornering state of the vehicle. When lateral acceleration Gy and yaw rate γ are both low, it is determined that the cornering state of the vehicle is within a non-cornering region in which the vehicle is traveling almost straight. Gain K2 of second correction section 32 is relatively increased. When yaw rate γ occurs but lateral acceleration Gy is weak, it is determined that the cornering state of the vehicle is within a moderate cornering region. Gain K1 of first correction section 31 is relatively increased. Conversely when the cornering state of the vehicle is out of both of the non-cornering region and the moderate cornering region, gain K3 of compensation section 33 is relatively increased.

Next, the operation of the apparatus of the second embodiment is described in detail.

In the case of direct integration, there is no risk of creating a modeling error, but there is a drawback that errors of the integral calculus operations are accumulated. To avoid this, generally, a cumulative error of the integral calculus is reduced by way of adjustment of a time constant of the integral.

However, in the case that some errors of estimation take place, the system performance is continually affected by such errors for a while. In the case that the cornering state continues for a long time period, there is a possibility that a part of informational data, which data must be accumulated, is cut or deleted. Therefore, the direct integration does not correspond to an essential solution.

Therefore, in the second embodiment, a suitable alteration (or a suitable adjustment) and suitable compensation are made appropriately to sideslip angle β estimated by direct integration by means of first correction section 31, second correction section 32 and compensation section 33.

That is, during substantially straight driving of the vehicle, it is possible to perform highly accurate estimation of sideslip angle β by means of the vehicle-model based linear observer, and thus the weight for feedback compensation executed by second correction section 32 is relatively increased. When the vehicle is in a moderate cornering state for a short time period such that yaw rate γ occurs but lateral acceleration Gy is weak, and thus the vehicle has the difficulty of ensuring the "field force" (i.e., centrifugal force), the weight for feedback correction executed by first correction section 31 is relatively increased. Conversely, when the vehicle is in a cornering state enough to ensure the "field force" with lateral acceleration Gy increases, the weight for feedback compensation executed by compensation section 33 is relatively increased.

As will be appreciated from the above description, the compensating network denoted by reference sign 31 in FIG. 7 is the first correction section, while the compensating network denoted by reference sign 32 in FIG. 7 is the second correction section. The compensating network denoted by reference sign 33 in FIG. 7 is the compensation section. Arithmetic processing of the controller 2, by which a weight (weighting) for each of gains K1 to K3 is suitably altered, is called an "alteration section" herein.

Summarizing the second embodiment, in estimating sideslip angle β by direct integration, the apparatus of the second embodiment is comprised of first correction section, which performs feedback correction for parameters based on sideslip angle β estimated by direct integration on the basis of the principle of action of centrifugal force acting on the vehicle during cornering and the vehicle-body accelerations detected by the acceleration detection section. The second embodiment also comprises second correction section, which estimates sideslip angle β by the linear observer utilizing the vehicle model separately from the direct integration and performs feedback correction for integral calculus of the direct integration based on the deviation between sideslip angle β estimated by the linear observer and sideslip angle β estimated by the direct integration.

Also provided is the alteration section that alters, depending on the cornering state of the vehicle, the relative weights among feedback compensation performed by the compensation section, feedback correction performed by first correction section and feedback correction performed by second correction section.

Therefore, it is possible to coordinate these compensating networks with each other while making use of the advantage of feedback correction achieved by first correction section, the advantage of feedback correction achieved by second correction section and the advantage of feedback compensation achieved by the compensation section. As a whole system, it is possible to ensure high-precision estimation of sideslip angle β.

Second, when the cornering state of the vehicle is within the non-cornering region, the weight for feedback correction achieved by second correction section is relatively increased. When the cornering state of the vehicle is within the moderate cornering region, the weight for feedback correction achieved by first correction section is relatively increased. When the cornering state of the vehicle is out of both of the non-cornering region and the moderate cornering region, the weight for feedback compensation achieved by the compensation section is relatively increased.

Therefore, it is possible to more certainly coordinate these compensating networks with each other, while making use of the advantage of feedback correction achieved by first correction section, the advantage of feedback correction achieved by second correction section and the advantage of feedback compensation achieved by the compensation section. As a whole system, it is possible to ensure high-precision estimation of sideslip angle β.

Third, sideslip angle β between the longitudinal direction of the vehicle body and the direction of travel of the vehicle is estimated via an integral calculus operation that utilizes the vehicle operating conditions as parameters. The acceleration detection section is provided to detect accelerations Gy and Gx exerted on the vehicle body and acting in two different directions. Also provided is the first correction section that performs feedback correction for lateral acceleration Gy, serving as a parameter, based on sideslip angle β estimated by direct integration on the basis of the principle of action of centrifugal force acting on the vehicle during cornering and the vehicle-body accelerations Gy and Gx detected by the acceleration detection section.

Therefore, in spite of the simple system configuration, it is possible to easily accurately estimate sideslip angle β. Additionally, there is no risk of causing a modeling error of the vehicle model.

In the apparatus of a third embodiment, first sideslip angle $β_2$ itself, which is calculated by estimate compensator 20, is calculated or given as sideslip angle β. That is, sideslip angle β is calculated from the following expression:

$$β = \frac{1}{2}π - A\tan\left(\frac{Gy - \dot{V}y}{Gx - \dot{V}x}\right) \tag{7}$$

Figure 9:
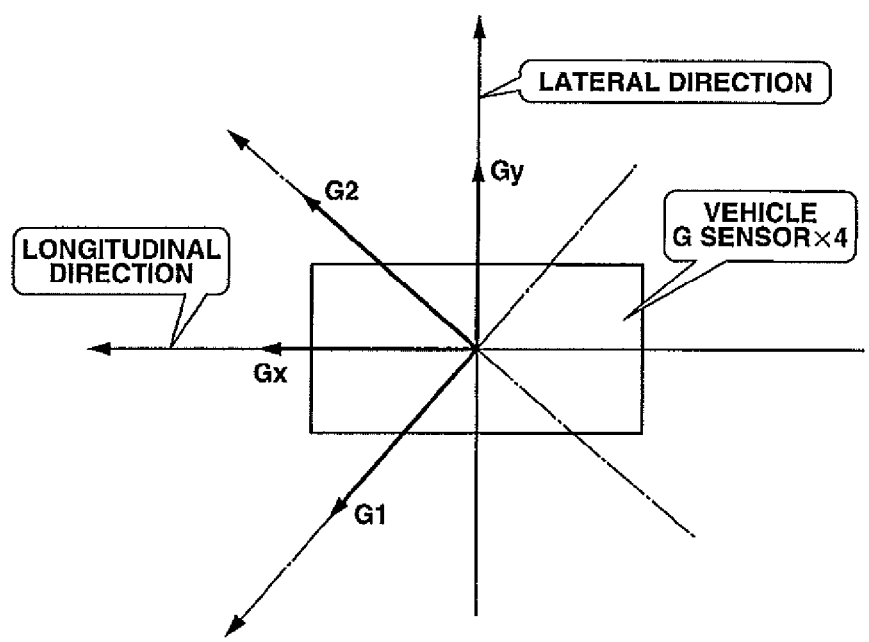
FIG. 9 is a diagram explaining an apparatus of a third embodiment.

As can be seen from the diagram of FIG. 9, separately from lateral acceleration sensor 14 and longitudinal acceleration sensor 15, two additional acceleration sensors are provided to detect accelerations G1 and G2 in two different directions inclined at ±45 degrees with respect to the longitudinal direction of the vehicle. When lateral acceleration Gy or longitudinal acceleration Gx is less than or equal to a predetermined acceleration value, sideslip angle β is calculated by using the detected values of the additional acceleration sensors G1 and G2 respectively inclined at ±45 degrees with respect to lateral and longitudinal acceleration sensors 14 and 15.

That is, the same calculation method as previously described is utilized, but the result of the calculation is adjusted or altered by the inclination angle (i.e., 45 degrees) of each of the additional acceleration sensors G1 and G2. In the third embodiment, the inclination angle is set to ±45 degrees. The inclination angle may be arbitrarily set to an angle other than ±45 degrees.

The operation of the apparatus of the third embodiment is next described in detail.

Suppose that a so-called division-by-zero (/zero) error occurs in the Atan-calculation of mathematical expression (7). In such a case, the calculated value tends to diverge, and therefore it is impossible to calculate sideslip angle β. Thus, accelerations G1 and G2 in two directions inclined at ±45 degrees with respect to the longitudinal direction of the vehicle are detected, and then sideslip angle β is calculated by using these accelerations G1 and G2. Assuming that all the acceleration sensor signal values become less than or equal to their predetermined acceleration values, that is, the subtracted value obtained by subtracting the time rate of change in vehicle velocity from each of the acceleration sensor signal values in the presence of a change in vehicle velocity becomes less than or equal to its predetermined threshold value, it is determined that the vehicle is substantially in the straight traveling state, and whereby sideslip angle β is set to "0". In general purpose vehicles, sideslip angle β is limited within a particular angular range. Thus, if these two acceleration sensors are installed to be out of the particular angular range, it is possible to always avoid the occurrence of a so-called division-by-zero (/zero) error.

According to the third embodiment, accelerations in two directions, each differing from each of the longitudinal and lateral directions of the vehicle, are detected. Therefore, it is possible to avoid a risk that sideslip angle β cannot be calculated owing to the occurrence of a division-by-zero (/zero) error. It is possible to certainly calculate sideslip angle β.

In the apparatus of a fourth embodiment, feedback gain K2 used in the apparatus of the first embodiment is set depending on the cornering state of the vehicle in order to enhance the accuracy of feedback compensation when a continuous steering action to the left or to the right is made, for example, during double lane-changing. Hereinafter explained with reference to the flow chart of FIG. 10 is the gain setting process of feedback gain K2.

At step S1 lateral acceleration Gy is read. Then, at step S2 feedback gain K2 is calculated or retrieved from the control map of FIG. 5.

At step S3 a check is made to determine whether feedback gain K2 is greater than "0". When the result of the query in step S3 is that K2=0, gain K2 remains unchanged (i.e., remains at 0), and then the main program begins again. On the other hand, when the result of the query of step S3 is that K2>0, the routine proceeds to step S4.

At step S4 yaw rate γ and steer angle θ are both read. Next, at step S5 a front-wheel slip angle $β_F$ is calculated based on steer angle θ and sideslip angle β.

Processing advances to step S6, where a check is made to determine whether the direction of occurrence of front-wheel slip angle $β_F$ is opposite to the direction of yaw rate γ. When the direction of occurrence of front-wheel slip angle $β_F$ and the direction of yaw rate γ are identical to each other, it is concluded that a centrifugal force acting on the vehicle body occurs. Gain K2 remains unchanged, and then the main program is begun again. Conversely, when the direction of occurrence of front-wheel slip angle $β_F$ is opposite to the direction of yaw rate γ it is determined that a centrifugal force acting on the vehicle body temporarily disappears. Thus, the routine proceeds to step S7 where feedback gain K2 is corrected and adjusted to "0".

At step S8 a check is made to determine whether the direction of occurrence of front-wheel slip angle $β_F$ is identical to the direction of lateral acceleration Gy. When the direction of occurrence of front-wheel slip angle $β_F$ is opposite to the direction of lateral acceleration Gy, it is determined that the centrifugal force acting on the vehicle body has not reoccurred. Thus, the routine returns to step S7. That is, the condition of K2=0 is maintained until the centrifugal force acting on the vehicle body reoccurs. Conversely, when the direction of front-wheel slip angle $β_F$ is identical to the direction of lateral acceleration Gy, it is determined that the centrifugal force acting on the vehicle body has reoccurred. Then the main program is begun again from the beginning. Operation of the fourth embodiment is next described in detail.

As shown in FIG. 11, when a continuous steering action to the left or to the right is made sideslip angle β remains (|β|>0) at the moment when the turning direction is switched from one to the other, but a phenomenon takes place wherein a centrifugal force acting on the vehicle body temporarily disappears. Therefore, it is impossible to accurately calculate first sideslip angle $β_2$ for a period of time during which the centrifugal force disappears. This exerts a bad influence on feedback compensation.

Therefore, in the operation of the apparatus of the fourth embodiment, when it is determined that a centrifugal force acting on the vehicle body temporarily disappears (i.e., the decision result of step S6 is "Yes"), feedback gain K2 is limited to "0" until the centrifugal force reoccurs (see step S7) so as to avoid feedback compensation being affected badly.

The disappearance of centrifugal force is determined depending on whether front-wheel slip angle $β_F$ occurs in the opposite direction to yaw rate γ. In this manner, by comparing the turning direction and the direction of occurrence of front-wheel slip angle $β_F$, counter-steering action performed for drift running can be distinguished from steering action performed for double lane-changing whereby it is possible to accurately predict the disappearance of centrifugal force. This is because in the case of drift running the turning direction and the direction of occurrence of front-wheel slip angle $β_F$ are identical to each other. Hence, there is no disappearance of centrifugal force.

Thereafter, when it is determined that the centrifugal force recovers or reoccurs (i.e., the decision result of step S8 is "Yes"), the limitation on feedback gain K2 is canceled, and normal feedback compensation restarts. The reoccurrence of centrifugal force is determined depending on whether lateral acceleration Gy occurs in the same direction as front-wheel slip angle $β_F$.

In the fourth embodiment, feedback gain K2 is limited to "0" until the centrifugal force reoccurs. In lieu thereof, feedback gain K2 may be limited until a predetermined time period has expired from the point of time when it has been determined that a centrifugal force acting on the vehicle body disappears. That is, the response time of a change in vehicle behavior to steering action is determined depending on vehicle specifications. Thus, it is preferable to limit feedback gain K2 at least until the response time has expired. According to the apparatus of the fourth embodiment, it is possible to easily provide the same operation and effects as discussed above.

In the fourth embodiment, it is determined that a centrifugal force acting on the vehicle body temporarily disappears when front-wheel slip angle $β_F$ occurring in the opposite direction to the turning direction is detected. In lieu thereof, it may be determined that a centrifugal force acting on the vehicle body temporarily disappears when steer angle θ occurring in the opposite direction to the turning direction is detected. This is because a moment for a turning vehicle tends to reduce when a steering action is made in the opposite direction to the turning direction, and steer angle θ exceeds a neutral position. Thereafter the centrifugal force tends to temporarily disappear. According to such a modification, it is possible to easily provide the same operation and effects as discussed above.

Additionally, in the fourth embodiment feedback gain K2 is limited during a time period from the time when sideslip angle $β_F$ occurring in the opposite direction to the turning direction is detected to the time when the centrifugal force reoccurs. In lieu thereof, the limitation on feedback gain K2 may be canceled immediately when the return of steering angle to one direction occurs before a transition of the turning direction from one to the other. That is, assuming that steering action in the previous turning direction is recovered, the vehicle continues to draw a current turning locus without any disappearance of centrifugal force, and thus there is no need for limiting feedback gain K2.

Also in the fourth embodiment, when limiting feedback gain K2 or when canceling the limitation on feedback gain K2, feedback gain K2 itself is changed. In lieu thereof, a rate of change in feedback gain K2 (a variation of the feedback gain every predetermined time interval) may be suppressed. That is, feedback compensation can be greatly affected by a rapid change in feedback gain K2, and thus it is possible to prevent an oversensitive response by smoothly changing the feedback gain by means of a predetermined filter, thereby realizing the desirable feedback compensation.

Feedback gain K2 in the first embodiment is set depending on the cornering state of the vehicle. As a matter of course, the fundamental concept of the fourth embodiment may be applied to feedback gain K3 of the second embodiment. In such a case, it is possible to provide the same operation and effects as the second embodiment.

As will be appreciated from the above, the gain setting process shown in FIG. 10 is a part of a compensation section of the apparatus.

Summarizing the results of the fourth embodiment, when it is determined that a centrifugal force acting on the vehicle body temporarily disappears depending on the cornering state of the vehicle, the compensation section limits a weight for feedback compensation until the centrifugal force reoccurs. Therefore, when a continuous steering action to the left or to the right is made, for example, during double lane-changing, and thus a centrifugal force temporarily disappears, it is possible to avoid the accuracy of feedback compensation from being lowered owing to miscalculation of first sideslip angle $\beta_2$.

Second, when it is determined that a centrifugal force acting on the vehicle body temporarily disappears depending on the cornering state of the vehicle, the compensation section limits a weight for feedback compensation until a predetermined time period has expired from the point of time when it has been determined that the centrifugal force disappears. Therefore, it is possible to easily provide the previously-described operation and effects by way of only the measurement of elapsed time without detecting any reoccurrence of centrifugal force.

Third, the compensation section determines that a centrifugal force acting on the vehicle body temporarily disappears when the steered-wheel slip angle occurring in the opposite direction to the turning direction is detected. Therefore, counter-steering action performed for drift running can be distinguished from steering action performed for double lane-changing, and whereby it is possible to accurately predict the disappearance of centrifugal force. In lieu thereof, the compensation section may determine that a centrifugal force acting on the vehicle body temporarily disappears when the steer angle occurring in the opposite direction to the turning direction. In this case, it is possible to easily provide the previously-described operation and effects by way of only the detection of steer angle $\theta$ instead of calculating front-wheel slip angle $\beta_F$.

Fourth, the compensation section determines that the centrifugal force reoccurs when the lateral acceleration occurring in the same direction as the turning direction is detected. Therefore, it is possible to easily accurately determine the reoccurrence of centrifugal force.

Fifth, the compensation section cancels the limitation on the weight for feedback compensation immediately when the return of steering angle to one direction occurs before a transition of the turning direction from one to the other. Therefore, it is possible to easily accurately determine the reoccurrence of centrifugal force.

Sixth, the compensation section suppresses a time rate of change in weight for feedback compensation. Therefore, it is possible to smoothly change the weight for feedback compensation, thus realizing the desirable feedback compensation while preventing an oversensitive response.

Also, the above-described embodiments have been described in order to allow easy understanding of the present invention and do not limit the present invention. On the contrary, the invention is intended to cover various modifications and equivalent arrangement included within the scope of the appended claims, which scope is to be accorded the broadest interpretation so as to encompass all such modifications and equivalent structure as is permitted under the law.

What is claimed is:

1. A sideslip angle estimation apparatus for estimating a sideslip angle of a vehicle having a vehicle body, the apparatus comprising:
   a controller including:
      an offset angle estimation section operable to estimate an offset angle between a direction of a centrifugal force acting on the vehicle body and a lateral direction of the vehicle body, the centrifugal force being a force exerted on the vehicle body toward an outside from a turning center during a cornering act and the direction of the centrifugal force calculated based on acceleration values detected in two different directions with respect to the vehicle body;
      a sideslip angle estimation section operable to estimate a sideslip angle using an integration function incorporating a quantity associated with a running state of the vehicle, the sideslip angle being between a longitudinal direction of the vehicle body and a direction of travel of the vehicle; and
      a first feedback compensation section operable to apply feedback compensation to the sideslip angle, the feedback compensation based on applying a variable gain to a difference between the sideslip angle and the offset angle.

2. The sideslip angle estimation apparatus according to claim 1, further comprising:
   at least two acceleration sensors operable to detect the acceleration values in the two different directions with respect to a vehicle body including a first acceleration sensor operable to detect a first acceleration value in a first direction and a second acceleration sensor operable to detect a second acceleration value in a second direction different from the first direction; and
   a quantity-of-running-state sensing device operable to detect the quantity associated with the running state of the vehicle.

3. The sideslip angle estimation apparatus according to claim 2 wherein the quantity-of-running-state sensing device comprises at least one of a steer angle sensor and a yaw rate sensor.

4. The sideslip angle estimation apparatus according to claim 2, further comprising:
   a cornering state sensing device operable to detect a cornering state of the vehicle; and wherein the variable gain is dependent on the cornering state of the vehicle.

5. The sideslip angle estimation apparatus according to claim 1, further comprising:
   a cornering state sensing device operable to detect a cornering state of the vehicle; and wherein the controller includes:
   a compensation gain control section operable to control the variable gain for the feedback compensation based on the cornering state.

6. The sideslip angle estimation apparatus according to claim 5 wherein the compensation gain control section is operable to increase the variable gain as the cornering state of the vehicle approaches a limit.

7. The sideslip angle estimation apparatus according to claim 5 wherein the controller further comprises:
   a centrifugal force disappearance decision section operable to determine whether the centrifugal force acting on the vehicle body disappears; and wherein the compensation gain control section is operable to limit the variable gain until the centrifugal force reoccurs after the centrifugal force disappearance decision section determines that the centrifugal force acting on the vehicle body disappears.

8. The sideslip angle estimation apparatus according to claim 7 wherein the compensation gain control section is further operable to limit the variable gain until a predetermined time period has expired from a point of time when the centrifugal force disappearance decision section determines that the centrifugal force acting on the vehicle body-disappears.

9. A sideslip angle estimation apparatus for estimating a sideslip angle of a vehicle, comprising:
   a controller including:
      a first sideslip angle estimation section operable to estimate a first sideslip angle between a direction of centrifugal force acting on a vehicle body and a lateral direction of the vehicle body based on acceleration values detected in two different directions with respect to the vehicle body;
      a second sideslip angle estimation section operable to estimate a second sideslip angle between a longitudinal direction of the vehicle body and a direction of travel of the vehicle via an integral calculus operation that utilizes a quantity associated with a running state of the vehicle;
      a third sideslip angle estimation section operable to estimate a third sideslip angle using direct integration that utilizes the quantity associated with the running state as a parameter;
      a cornering state detection section that detects a cornering state of the vehicle; and
      a sideslip angle calculation section operable to calculate the sideslip angle of the vehicle based on the first sideslip angle and the second sideslip angle;
   wherein the sideslip angle calculation section comprises:
      a first correction section operable to perform a first feedback correction for the parameter of the third sideslip angle estimation section based on the third sideslip angle and the acceleration values;
      a second correction section operable to perform a second feedback correction for an integral calculus operation of the third sideslip angle estimation section based on a deviation between the second and third sideslip angles; and
      a compensation section operable to perform a feedback compensation for the integral calculus operation of the third sideslip angle estimation section based on a deviation between the first and third sideslip angles;
   wherein the first correction section is further operable to control a weight for the first feedback correction based on the cornering state of the vehicle;
   wherein the second correction section is further operable to control a weight for the second feedback correction based on the cornering state of the vehicle; and
   wherein the compensation section is further operable to control a weight for the feedback compensation based on the cornering state of the vehicle; and
   wherein the sideslip angle calculation section is operable to calculate the sideslip angle of the vehicle based on the first sideslip angle and the second sideslip angle by correcting the third sideslip angle with the first and second correction sections and with the compensation section.

10. The sideslip angle estimation apparatus according to claim 9 wherein the sideslip angle calculation section is further operable to calculate the sideslip angle of the vehicle based on the third sideslip angle corrected by the first correction section using a controlled weight for the first feedback correction, the second correction section using a controlled weight for the second feedback correction and by the compensation section using a controlled weight for the feedback compensation.

11. The sideslip angle estimation apparatus according to claim 9 wherein the second correction section is further operable to increase the weight for the second feedback correction relative to the weight for the first feedback correction and the weight for the feedback compensation when the cornering state of the vehicle is within a non-cornering region;
   wherein the first correction section is further operable to increase the weight for the first feedback correction relative to the weight for the second feedback correction and the weight for the feedback compensation when the cornering state of the vehicle is within a moderate cornering region; and
   wherein the compensation section is further operable to increase the weight for the feedback compensation relative to the weight for the first feedback correction and the weight for the second feedback correction when the cornering state of the vehicle is out of both of the non-cornering region and the moderate cornering region.

12. The sideslip angle estimation apparatus according to claim 1 wherein the controller further comprises:
   a vehicle-speed variation detection section that calculates a variation of vehicle speed in each of the two different directions with respect to the vehicle body; and
   wherein the offset angle estimation section is operable to estimate the offset angle by adjusting each of the acceleration values by the variation of the vehicle speed in a same direction.

13. The sideslip angle estimation apparatus according to claim 1, further comprising:
   at least one acceleration detection sensor operable to detect at least a first acceleration value in the longitudinal direction of the vehicle body, a second acceleration value in the lateral direction of the vehicle body, a third acceleration value in a direction differing from each of the longitudinal and lateral directions of the vehicle body and a fourth acceleration value in a direction differing from each of the longitudinal and lateral directions of the vehicle body and at a right angle to the direction of the third acceleration value; and wherein the offset angle estimation section is operable to use the third and fourth acceleration values to calculate the direction of the centrifugal force when at least one of the first acceleration value and the second acceleration value is less than or equal to a predetermined acceleration value.

14. An automotive vehicle comprising the sideslip angle estimation apparatus according to claim 1.

15. A sideslip angle estimation apparatus for estimating a sideslip angle of a vehicle, comprising:
   first means for detecting a first acceleration in a first direction with respect to a vehicle body;
   second means for detecting a second acceleration in a second direction with respect to the vehicle body;
   means for estimating an offset angle between a direction of centrifugal force acting on the vehicle body and a lateral direction of the vehicle body, the centrifugal force being a force exerted on the vehicle body toward an outside from a turning center during a cornering act and the direction of the centrifugal force calculated based on the first acceleration and the second acceleration;
   means for estimating a sideslip angle using an integration function incorporating a quantity associated with a running state of the vehicle, the sideslip angle being between a longitudinal direction of the vehicle body and a direction of travel of the vehicle; and means for applying feedback compensation to the sideslip angle by applying a variable gain to a difference between the sideslip angle and the offset angle.

16. A method of estimating a sideslip angle of a vehicle, comprising:
   detecting a first acceleration in a first direction with respect to a vehicle body;
   detecting a second acceleration in a second direction with respect to the vehicle body;
   estimating a first sideslip angle between a direction of centrifugal force acting on the vehicle body and a lateral direction of the vehicle body based on the first acceleration and the second acceleration;
   detecting a third acceleration in a third direction with respect to the vehicle body;
   detecting a fourth acceleration in a fourth direction with respect to the vehicle body;
   substituting the third acceleration and the fourth acceleration for the first acceleration and the second acceleration when estimating the first sideslip angle between the direction of the centrifugal force acting on the vehicle body and the lateral direction of the vehicle body when at least one of the first acceleration and the second acceleration is less than or equal to a predetermined acceleration value; and
   calculating the sideslip angle based on the first sideslip angle.

17. The method according to claim 16, further comprising:
   detecting a vehicle speed;
   estimating a second sideslip angle between a longitudinal direction of the vehicle body and a direction of travel of the vehicle body via an integral calculus operation using the vehicle speed;
   detecting a cornering state of the vehicle, and wherein calculating the sideslip angle based on the first sideslip angle further includes calculating the sideslip angle using the first sideslip angle and using the second sideslip angle depending on the cornering state.

18. The method according to claim 16 wherein detecting the first acceleration in the first direction with respect to a vehicle body further comprises detecting a lateral acceleration using a lateral acceleration sensor,
   wherein detecting the second acceleration in the second direction with respect to the vehicle body further comprises detecting a longitudinal acceleration using a longitudinal acceleration sensor,
   wherein detecting the third acceleration in the third direction with respect to the vehicle body further comprises detecting an acceleration value of a third acceleration sensor inclined at +45 degrees with respect to the lateral acceleration sensors, and
   wherein detecting a fourth acceleration in a fourth direction with respect to the vehicle body further comprises detecting an acceleration value of a fourth acceleration sensor inclined at +45 degrees with respect to the longitudinal acceleration sensors.

19. The sideslip angle estimation apparatus according to claim 1 wherein the integration function comprises a state estimator and the quantity associated with the running state of the vehicle comprises a lateral acceleration of the vehicle and a yaw rate.

20. The sideslip angle estimation apparatus according to claim 1 wherein the integration function comprises direct integration of an expression derived from a balance of motion in a lateral direction of the vehicle and the controller further includes:
   a second feedback compensation section operable to apply feedback compensation to the sideslip angle, the feedback compensation based on applying a variable gain to a difference between the sideslip angle and an integrated value for the sideslip angle based on a second integration function different from the direct integration, the second integration function incorporating the quantity associated with the running state of the vehicle.

* * * * *